L. S. SKELTON.
GLASS DRAWING APPARATUS.
APPLICATION FILED JUNE 26, 1917.

1,242,055.

Patented Oct. 2, 1917.

Inventor
L. Sherman Skelton

By
Attorney

UNITED STATES PATENT OFFICE.

LEVI SHERMAN SKELTON, OF OKMULGEE, OKLAHOMA.

GLASS-DRAWING APPARATUS.

1,242,055.   Specification of Letters Patent.   Patented Oct. 2, 1917.

Application filed June 26, 1917. Serial No. 176,974.

*To all whom it may concern:*

Be it known that I, LEVI SHERMAN SKELTON, a citizen of the United States, residing at Okmulgee, in the county of Okmulgee and State of Oklahoma, have invented new and useful Improvements in Glass-Drawing Apparatus, of which the following is a specification.

This invention relates to improvements in glass drawing apparatus, and particularly to glass drawing pots or rings and means for supplying air to the cylinder which is to be drawn.

The primary object of the invention is to provide a floating pot having a combined glass inlet and drain outlet opening, combined with a protecting baffle associated therewith to secure certain novel and beneficial results, and which is adjustable to facilitate the filling of the pot at the beginning of the draw.

A further object of the invention is to provide means for depressing the baffle to permit free flow of the glass to the pot at the beginning of the draw, which means also serves as a source of supply of air to the interior of the cylinder while the latter is being drawn.

With these and other objects in view, the invention consists of the features of construction, combination and arrangement of parts hereinafter fully described and claimed, reference being had to the accompanying drawing, in which:—

Figure 1:
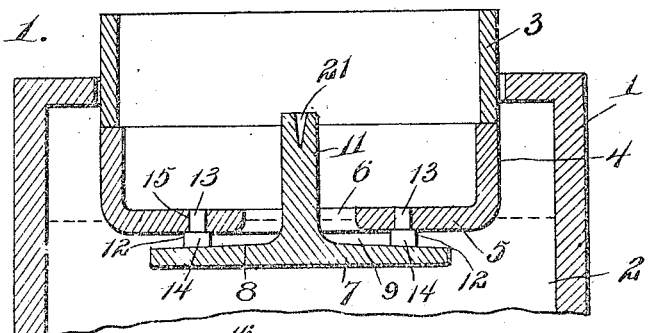
Figure 1 is a vertical section through a glass reservoir, shield and a drawing pot embodying my invention, showing the pot in normal floating position prior to depression.

Referring to the drawing, 1 designates a doghouse or other receptacle containing a main charge 2 of molten glass from which the cylinders are to be drawn, and 3 designates a tubular shield or water jacket such as is commonly employed for protecting the drawing pot, the surface of the glass and the lower portion of the cylinder to a greater or less extent from the chilling effects of the air.

In carrying my invention into practice, I provide a drawing pot or ring 4 made of fire-clay or other suitable material of less specific gravity than the molten glass, so that the pot is adapted to float upon the surface of the glass for transferal back and forth between the furnace tank and the receptacle 1 at the drawing station. This pot comprises a cylindrical body having a bottom 5 formed with a combined glass inlet and drain outlet opening 6. This opening 6 is of considerably less diameter than the body of the pot, and arranged beneath the bottom 5 of the pot is a horizontally disposed baffle plate or disk 7, which is circular in form, and of somewhat less diameter than the pot body but of greater diameter than the opening 6.

The disk 7 is provided with a convex upper surface 8, highest at the center and thence sloping toward its peripheral edge, for the purpose of facilitating the drainage off of the aftermath in the emptying of the pot after a draw is made. The disk is supported in spaced relation to the bottom 5 so as to form a channel 9 between its upper surface and the lower surface of the bottom 5, which channel is provided for the circulation of the glass in the filling and emptying of the melted aftermath, as hereinafter described.

Figure 2:
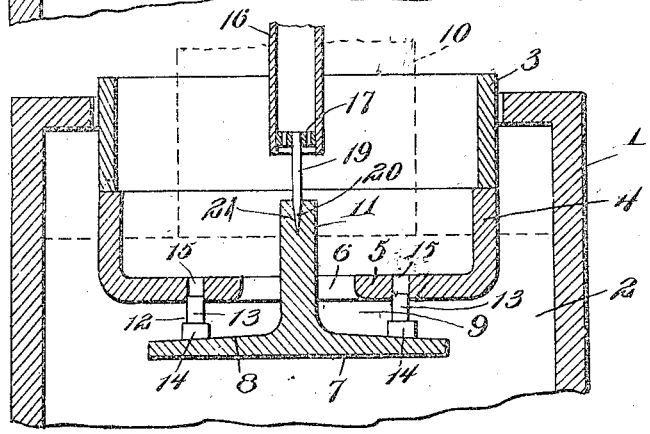
Fig. 2 is a similar view showing the pot and disk depressed for drawing action in the production of a cylinder, and also showing the blow pipe in operative position.
Figure 3:
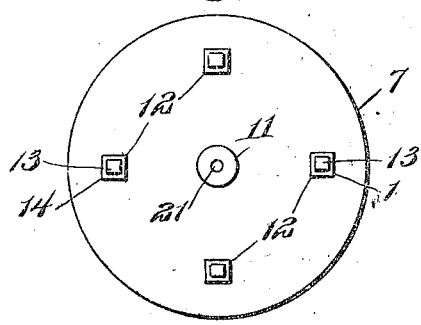
Fig. 3 is a top plan view of the baffle plate or disk.
Figure 4:
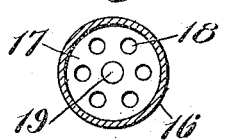
Fig. 4 is a detail section through the blow pipe.

The disk 7 is preferably made of the same material as the pot, and forms a flotation medium which adapts the pot to float at a comparatively high level, such a level that the upper surface of the bottom 5 of the pot normally lies at the same or slightly above the level of the surface of the glass 2, as shown in Fig. 1, to effect the complete drainage of the aftermath from the pot when the latter is in normal floating position. The pot is adapted to be depressed during the drawing action by a downward movement of the shield 3 to the position shown in Fig. 2, whereby the pure glass from the bath 2 will be forced upwardly through the channel 9 and opening 6 into the pot to the level indicated to supply a charge of glass within the pot for the production of the cylinder 10.

The disk 7 by reason of its arrangement described also serves an a non-conducting barrier between the charge of glass in the pot or between the atmosphere and the body of glass 2 in the doghouse, to reduce loss of heat from the body of glass 2 as well as the chilling effect of the air at the drawing opening upon such body of glass, thus keeping the glass at the drawing station at the proper temperature and reducing to a large extent liability of chilling of the glass with its deleterious consequences. In the drawing operation the disk furthermore serves as a means for preventing undue fluctuations of temperature between the body of glass 2 and the charge of glass in the pot. A further function of the disk is that it serves as a drag to cause a flow of glass through the channel 9 when the pot is moved from the tank into drawing position for use, the current of molten glass thus established producing a suction whereby the melted aftermath or residue contained in the pot will be positively drawn outward and discharged.

Projecting upwardly from the center of the disk 7 is a stem or projection 11, and also projecting upwardly from the disk between said stem and the edge of the disk, and arranged concentrically with relation to said stem, is a series of guiding projections 12 having upper reduced portions 13 and lower enlarged portions 14, the portions 13 serving as guide pins movable in guide openings 15 in the bottom of the pot, and the portions 14 serving as stops or abutment shoulders to engage the bottom of the pot and thereby limit the upward movement of the disk. The pins 13 and openings 15 are preferably of angular form to positively guide and center the disk in its movements, and said pins are adapted to permit the disk to be moved downward a predetermined distance below the bottom 5 to increase the depth of the channel 9, while the shoulders 14 are adapted to arrest the movement of the disk when elevated to its fullest position, so as to contract the channel 9 to a predetermined degree and prevent the disk from contacting directly with the bottom of the pot.

Normally the disk 7 is disposed in the position shown in Fig. 1, by the floating action of the disk, whereby it is normally held elevated to maintain the channel 9 at its limited depth, in which operation the stops 14 abut against the bottom of the pot. When the disk is so disposed it serves as a non-conducting barrier between the atmosphere or charge of glass in the pot and the surface of the body of glass 2, whereby loss of heat from the body of glass 2 is reduced at the drawing station, while chilling of the glass through the action of the air at the drawing station is also reduced to the minimum, thus keeping the body of glass 2 at the drawing point in a highly heated and purified state. It will be understood that after the cylinder is drawn the pot containing the residue of glass is moved back into the tank, whereby the aftermath contained in the pot is subjected to the high temperature of the tank and melted. When the pot is again drawn back into the doghouse for subsequent use, the movement of the baffle 7 through the body of glass 2 causes a current to flow through the restricted channel 9, and this current induces suction on the melted aftermath contained in the pot, whereby all the melted refuse glass within the pot is drawn back into the tank to be re-purified. Thus when the pot is brought back into drawing position it will have been fully emptied of all impure glass, so that upon its depression it will be filled with a fresh charge of pure glass preparatory to the production of a perfect cylinder therefrom.

The disk 7 is made adjustable with relation to the bottom 5 and opening 6 in order that the depth of the channel 9 may be increased to facilitate the filling of the pot with a charge of glass at the beginning of the draw, whereby the operation is greatly expedited on account of the increased area of the channel or space between the pot and disk. In the operation of filling the pot, the pot is depressed, as stated, by means of the shield 3 from the position shown in Fig. 1 to the position shown in Fig. 2, whereby the level of the glass 2 is brought to a point about mid way of the depth of the pot, causing the glass to flow upwardly into the pot through the opening 6. When the pot is depressed the disk 7 is also depressed to the position shown in Fig. 2 to increase the depth of the channel 9 and causes the glass to flow with greater speed and facility to the pot. The means for depressing the disk 7, broadly considered, may be of any suitable type, but in the present instance I have shown a disk depressing device which also serves as a blow pipe for supplying air to the interior of the cylinder. This pipe or tube 16 is provided at its lower end with a disk 17 having a series of air passages 18 for the flow of air therethrough, and carried by this disk is a depending pin or projection 19 having a tapered extremity 20 to enter a tapering socket 21 in the top of the stem 11, whereby the pin is adapted to be readily brought into engagement with the stem for the disk depressing action. The pipe 16 in practice is telescopically connected with an overhead air supply pipe or air reservoir of any suitable kind and provided with a controlling valve, whereby when the pipe is moved downward the disk may be depressed and air permitted to flow from the pipe into the cylinder 10. It will thus be seen that the pot and disk may be depressed to fill the pot with a charge of glass, and the bait then operated in the usual manner to form the neck and draw the cylinder, after which air may be admitted to the interior of the cylinder through the passages 18 to chill the cylinder at the bottom after it has obtained its full diameter, the air then flowing upwardly through the cylinder and maintaining the interior thereof at a temperature substantially equal to the exterior temperature, whereby the diameter of the cylinder will be maintained and irregularities in the drawing action prevented. It will, of course, be understood that the pipe 16 may be raised and lowered by hand or any suitable mechanism and extends downwardly through the opening in the bait, so that the bait may be raised and lowered without interference therefrom.

Having thus fully described my invention, I claim:

1. In a glass drawing apparatus, a drawing pot having a filling and drain opening in the bottom thereof, and also having guide openings in its bottom, a baffle disk or plate disposed beneath the bottom of the pot, guiding projections extending upwardly from the disk and engaging said guide openings in the pot, whereby the disk is adjustably connected with the bottom of the pot, and stops arranged to limit the upward movement of the disk to leave a restricted channel between the pot and disk when the disk is in its uppermost position.

2. A drawing pot having a filling and drain opening in the bottom thereof, a baffle disk or plate disposed beneath the pot and adjustable toward and from the bottom thereof, and means for limiting the upward movement of the disk, to provide a restricted channel between the pot and disk at the limit of upward movement of the disk.

3. A drawing pot having a filling and drain opening in the bottom thereof, a baffle plate or disk disposed beneath the pot and forming a channel communicating with said opening, means adjustably connecting the disk with the pot for relative vertical movements, and abutments carried by the disk to engage the bottom of the pot for limiting the upward movement of the disk, to leave a restricted channel between the pot and disk in the uppermost position of the disk.

4. A drawing pot having a filling and drain opening in the bottom thereof, an adjustable baffle plate or disk disposed beneath the bottom of the pot, and means holding the disk in guided connection with the pot, said means being adapted to limit the upward movement of the disk to leave a restricted channel between the pot and disk in the uppermost position of the disk.

5. A drawing pot having a filling and drain opening in the bottom thereof, a baffle disk disposed beneath the bottom of the pot and of greater diameter than said opening, and guiding projections between the pot and disk for permitting adjustment of the disk, said guiding projections having means associated therewith to limit the upward movement of the disk, so as to leave a restricted channel between the pot and disk in the uppermost position of the disk.

6. A glass drawing pot having a filling and drain opening in the bottom thereof, and also having guide openings in its bottom, a baffle disk or plate disposed beneath the pot and adjustable toward and from the same, guide posts projecting upwardly from the disk and engaging said guide openings, stop devices for limiting the upward movement of the disk to leave a restricted channel between the pot and disk in the uppermost position of the disk, and a projection extending upwardly from the disk into the pot through the filling and drain opening for engagement with the device whereby said disk may be depressed.

7. A drawing pot having a filling and drain opening in the bottom thereof, a baffle plate or disk disposed beneath the pot and in guided connection therewith, and a projection extending from the disk upwardly from said opening into the pot, whereby said disk is adapted to be depressed, the guiding connection between the pot and disk being operative to limit the upward movement of the disk, so as to leave a restricted channel between the pot and disk in the uppermost position of the disk.

8. A drawing pot having a filling and drain opening in the bottom thereof, a baffle plate or disk disposed beneath the pot and adjustable vertically with relation thereto, means for guiding the disk and limiting the upward movement of the disk, so as to leave a restricted channel between the pot and disk when said disk is in its uppermost position, a projection extending upwardly into the pot from the disk through said filling and drain opening, said projection having a recess in the upper end thereof, a blow pipe having discharge orifices at its bottom, and a pin extending downwardly from said pipe for engagement with the recess in said projection.

9. A drawing pot having a filling and drain opening in the bottom thereof, a baffle plate or disk disposed beneath the pot and adjustable with relation to the bottom thereof, said disk being in guided connection with the pot, means for limiting the upward movement of the disk so as to leave a restricted channel between the pot and disk in the uppermost position of the disk, a projection from the disk extending upwardly through the opening in the pot, and a vertically movable air supply pipe adapted for engagement with said projection to depress the disk.

In testimony whereof I affix my signature in presence of a witness.

L. SHERMAN SKELTON.

Witness:
  BENNETT S. JONES.